United States Patent [19]

Davis et al.

[11] Patent Number: 5,106,175

[45] Date of Patent: Apr. 21, 1992

[54] LOCATABLE OBJECT SUITABLE FOR UNDERGROUND USE AND METHODS OF LOCATING SAME

[75] Inventors: Donald D. Davis, Stone Mountain; William S. Pesto, Alpharetta; Albert J. Schepis, Norcross; Loyce A. Turner, Smyrna, all of Ga.

[73] Assignee: AT&T Bell Laboratories, Murry Hill, N.J.

[21] Appl. No.: 618,109

[22] Filed: Nov. 29, 1990

Related U.S. Application Data

[63] Continuation-in-part of Ser. No. 458,002, Dec. 28, 1989, abandoned.

[51] Int. Cl.⁵ .................................................. G02B 6/44
[52] U.S. Cl. .................................. 385/100; 343/719; 340/571
[58] Field of Search ............... 350/96.23; 343/719, 343/741, 866, 894; 340/571, 572

[56] References Cited

U.S. PATENT DOCUMENTS

| | | | |
|---|---|---|---|
| 3,216,016 | 11/1965 | Tanner | 343/719 |
| 3,500,373 | 3/1970 | Minasy | 340/258 |
| 3,670,717 | 6/1987 | Sender | 343/719 |
| 3,863,244 | 1/1975 | Lichblau | 340/280 |
| 3,894,283 | 7/1975 | Schonstedt | 324/3 |
| 3,909,704 | 9/1975 | Schonstedt | 324/3 |
| 3,961,245 | 6/1976 | Schonstedt | 324/43 R |
| 3,977,072 | 8/1976 | Schonstedt | 29/602 R |
| 4,110,689 | 8/1978 | Schonstedt | 324/254 |
| 4,163,877 | 8/1979 | Schonstedt | 179/146 E |
| 4,334,227 | 6/1982 | Marks | 343/719 |
| 4,369,557 | 1/1983 | Vandebult | 29/25.42 |
| 4,639,674 | 1/1987 | Rippingale | 324/326 |
| 4,670,717 | 6/1987 | Sender | 324/338 |
| 4,778,248 | 10/1988 | Arzur | 350/96.29 |
| 4,811,030 | 3/1989 | Pedersen | 343/788 |
| 4,818,312 | 4/1989 | Benge | 156/52 |
| 4,818,944 | 4/1989 | Rippingale | 324/326 |
| 4,822,134 | 4/1989 | Campbell | 350/96.23 |
| 4,920,335 | 4/1990 | Andrews | 340/572 |
| 4,954,814 | 9/1990 | Benge | 340/572 |

*Primary Examiner*—William L. Sikes
*Assistant Examiner*—Robert E. Wise
*Attorney, Agent, or Firm*—Edward Somers

[57] ABSTRACT

An all-dielectric cable (20) or object which is destined to be buried is provided with at least one electronically resonant marker (44). After the cable or object is buried, a tradesperson may locate the cable or object by causing an electromagnetic signal (71), which comprises at least one frequency to be transmitted by a transceiver (60) and to be induced into the electronically resonant marker associated with the cable or object. A return signal (73), which is radiated by the electronically resonant marker at a frequency different from the at least frequency, is received by the transceiver. Characteristics of the return signal provide useful information for the determination of the location of the buried cable or object.

29 Claims, 3 Drawing Sheets ic cables for the purposes of maintenance and rearrangement and marking the path of the cable so as to avoid
LOCATABLE OBJECT SUITABLE FOR UNDERGROUND USE AND METHODS OF LOCATING SAME This application is a continuation-in-part of application Ser. No. 07/458,002, filed on Dec. 28, 1989, now abandoned.

TECHNICAL FIELD

This invention relates to a locatable object suitable for underground use and to methods of locating same. More specifically, it relates to methods of locating a buried, all-dielectric cable which comprises an electromagnetically responsive, electronically resonant marker wherein an electromagnetic signal is caused to be induced into the electronically resonant marker by an above-ground transmitter and a return signal is received by an above-ground receiver. The characteristics of the return signal provide relevant cable location information.

BACKGROUND OF THE INVENTION

Communications cables used for the transmission of information utilize two types of transmission media, copper or other metallic conductor media and optical fiber. There are also hybrid designs of communications cable that combine these two media.

Copper and optical fiber communications cables, while differing substantially in the mode in which they transmit information and even the form of energy they transfer, are nonetheless used in somewhat similar ways using similar installation methods. For instance, either cable may be used in terrestrial aerial applications or either may be buried directly in the ground.

Because copper cable is inherently metallic, unlike optical fiber cable which need not contain any metallic materials, that is all materials may be dielectric, special shielding is often necessary to protect that cable from the hazard of lightning strikes. Portions of suspended cable as well as surface exposed portions of buried cable may attract lightning. The problem with lightning strikes has been overcome partially by incorporating into the cable a metallic shield that encloses the circumference of the cable and extends longitudinally throughout the cable. The metallic shield is often disposed between an inner jacket and an outer jacket of the cable and is caused to be grounded at different points along the length of the cable. If lightning strikes a portion of the cable, the energy couples into the metallic shield and travels to ground, hopefully preventing damage to the transmission portion of the cable disposed within the metallic shield.

Optical fiber cables are often strengthened by incorporating metallic strength members into the sheath system thereof. Typically, a plurality of strengthening wires are disposed helically along the length of the cable before the cable receives a final outermost plastic jacket. Because these wires are metallic, they may attract lightning strikes to the cable. Lightning protection is provided for some lightguide cables in a method similar to that used to protect copper cable, that is, a metallic shield is disposed about an inner member of the cable sheath system during cabling. A final plastic jacket is disposed about the metallic shield.

It is desirable to be able to locate, for example, buried cables, for the purposes of maintenance and rearrangement and marking the path of the cable so as to avoid cutting the cable during future cable placement and digging operations. Buried cables, wires, pipes and other objects whose structures comprise continuous, longitudinally extending metal portions such as shields or strength members may be located by use of equipment referred to as cable locators. These so-called cable locators comprise two components, a signal transmitter and a signal receiver. The signal transmitter which is connected directly or inductively to a metallic portion of the buried structure and left in a stationary position is caused to transmit a so-called tracing tone into the structure. The tracing tone is an electric signal which causes the metallic portions of the buried object to radiate a characteristic electromagnetic field. An operator holds the receiver close to the ground and causes it to swing in a side-to-side motion above an area where the operator thinks the cable is located. The receiver is fitted with an electromagnetically inductive pick-up coil transducer which when excited by the electromagnetic field produced by the tracing tone produces a signal which can be interpreted to indicate the relative location of the buried object.

Recently, optical fiber cable sheath systems have been developed which provide the strength necessary for optical cable integrity without the use of metallic strength members. In U.S. Pat. No. 4,874,219 issued on Oct. 17, 1989 in the names of C. J. Arroyo, et al. there is disclosed an optical fiber cable system comprising an optical fiber core, a tube in which the core is disposed, a longitudinally extending water blocking tape, a plurality of helically wrapped longitudinally extending nonmetallic strength members and an outer jacket. One of the benefits of this so called all-dielectric design is that, since it includes no metallic sheath system members, it does not attract lightning strikes nor will it transmit hazardous voltage if inadvertently crossed with power cables.

One of the drawbacks of the aforementioned all-dielectric design is that conventional buried cable locating techniques may not be used. If the buried cables do not contain any longitudinally extending metallic portions, then obviously the conventional means for locating buried cables described hereinbefore may not be used. What is needed and what seemingly is nowhere shown in the prior art are apparatus and methods for locating all-dielectric buried cables.

SUMMARY OF THE INVENTION

The foregoing problem of locating buried all-dielectric cables has been solved by the methods and system of this invention.

An electronically resonant marker comprising a printed circuit which includes an inductive portion and a capacitive portion and a surface mounted diode is caused to be disposed in association with a concealed object, such as an all-dielectric optical cable, for example. The reactive components of the marker and the diode are caused to be of such values that the marker characteristically resonates when excited by an external electromagnetic stimulus.

A transceiver comprising a transmitting portion is provided to produce and transmit through a high gain antenna electromagnetic energy comprising energy of at least two frequencies, a first frequency, $f_a$, of the transmitted energy and a second frequency, $f_b$, which is within 5% of the value of the first frequency, $f_a$. A narrow bandwidth receiver, which has its input connected to a high gain antenna which may be the same antenna to which the transmitting portion is attached, is provided and is effective to receive an intermodulation product frequency of the two transmitted frequencies.

An optical fiber cable which includes electronically resonant markers may be buried and thus obscured from vision. In the case of an optical cable, the electronically resonant markers may be included within or between coaxially disposed dielectric sheath members of the cable. The electronically resonant markers are spaced along the length of the cable and are circumferentially staggered.

The cable may be located with the transceiver device described above. To do so, a tradesperson causes the transceiver to be scanned or waved in the general area where the cable is believed to be buried. The transmitting portion is caused to transmit electromagnetic energy comprising energy of one frequency and which in one embodiment may comprise two frequencies. As this is done, the electromagnetic energy generated by the transmitting portion penetrates the earth and in so doing causes the electronically resonant markers to become energized. Because the electronically resonant markers have a non-linear response, they radiate an electromagnetic field having a frequency which is different from said at least one frequency and which for transmitted energy comprising two frequencies may be an intermodulation product of the two transmitted frequencies. The receiver receives the intermodulation signal and converts the signal into an output signal useful for determining the location of the buried cable.

BRIEF DESCRIPTION OF THE DRAWING

Other features of the present invention will be more readily understood from the following detailed description of specific embodiments thereof when read in conjunction with the accompanying drawings, in which:

FIG. 2 is a perspective view of an all-dielectric, communications cable having a sheath system which includes a plurality of electronically resonant markers;

DETAILED DESCRIPTION

Figure 1:
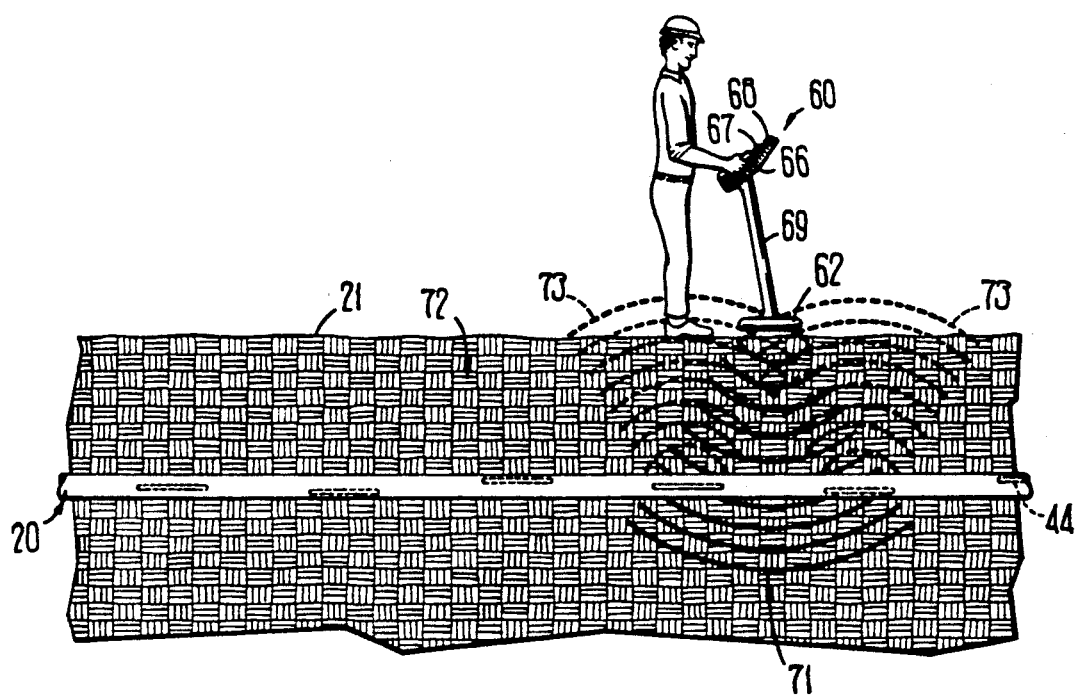
FIG. 1 is a pictorial representation of the practice of a cable locating method of this invention.

Looking now at FIG. 1 there is shown a pictorial representation of the practice of a cable locating method of this invention. As can be seen in FIG. 1 a cable 20 is shown buried beneath a ground surface 21. As shown in FIG. 2, the cable 20 comprises a core 22 which comprises at least one optical fiber 23 which is disposed within a longitudinally extending core tube 24. In a preferred embodiment, a plurality of strength members 26—26 are disposed longitudinally or helically along the length of the core tube 24. Further, a water blocking material 27 may be disposed about the core tube. The water blocking material may be a tape as shown or, alternatively, may be a water blocking yarn (not shown). It should be understood that the cable 20 is an all-dielectric cable, that is, all of the materials that comprise the cable, for example, the strength members, are non-metallic. For reasons which should be apparent, it is important for the cable 20 to be locatable notwithstanding its underground concealment.

Figure 3:
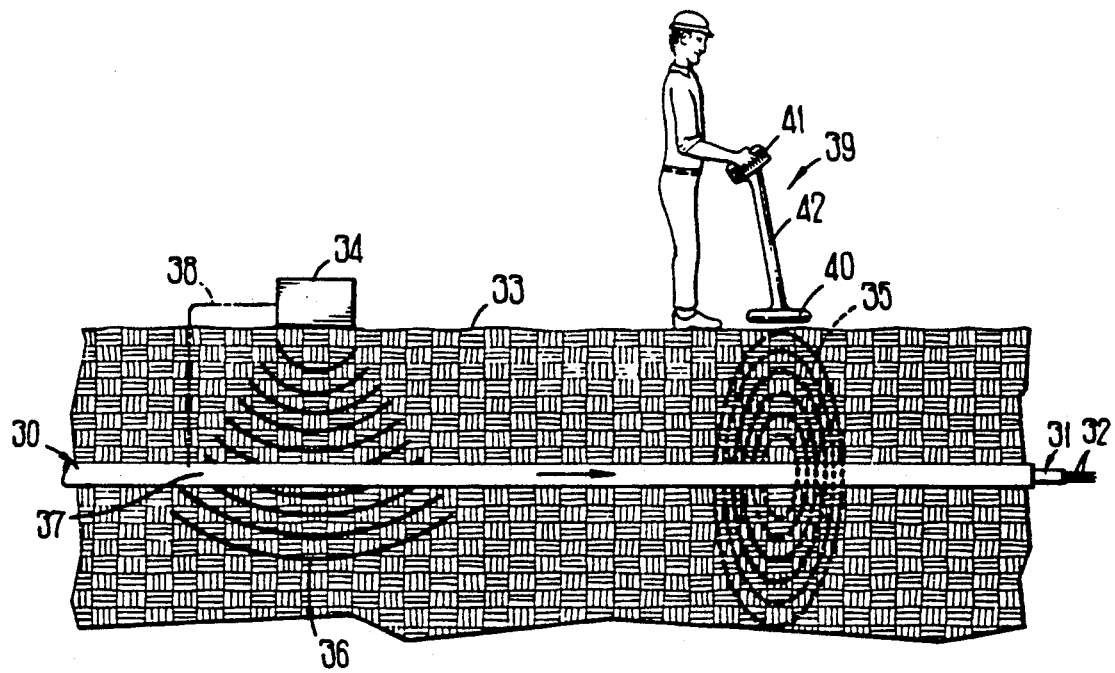
FIG. 3 is a pictorial representation of the practice of a prior art cable locating method for locating cables which include continuous metallic elements.

When a buried non-dielectric cable, that is, a cable which contains continuous metallic elements, is desired to be located, a prior art cable finding method may be utilized. Looking at FIG. 3, there is shown a pictorial representation of a practice of a prior art cable locating method. As can be seen in FIG. 3 a cable 30, comprising a core 31 of copper wires 32—32 is shown buried beneath a ground surface 33. A signal transmitter 34 is shown inducing a so called trace tone 36 into a portion 37 of the cable 30. It should be understood that in an alternative embodiment, the signal transmitter 34 could be connected conductively to the cable 30 by a wire 38. The trace tone 36 may be within a frequency range of 50 hertz (Hz) to a few hundred kilohertz (KHz). In this frequency range the trace tone 36 is in the form of an A.C. current and will travel along the length of the cable 30 and in so doing generate a magnetic field 35 around the cable.

A tradesperson is shown with a hand carried detector 39 comprising a sensor portion 40 which comprises a multi-turn wire loop, a handle portion 41 which comprises a signal strength indicator and a stalk portion 42. During a cable locating episode, the hand carried detector 39 is held such that the sensor portion 40 is positioned just above but not touching the ground surface 33. As the tradesperson sweeps the sensor portion 40 above the general location of the cable 30, the magnetic field 35 induces an electric current into the multi-turn wire loop of the sensor 40. The induced electric current in the wire loop is converted so that an indication of its strength may be displayed on a meter or be heard as a varying volume tone produced by a tone transducer either of which may be located in the handle portion of the hand-carried detector 39. As the hand carried detector is swept in a general area above the cable a relatively high meter reading or tone volume would indicate for example that the sensor portion 40 is directly above the buried cable 30. As the sensor portion is moved laterally the meter reading or tone volume would decrease. Consequently, a relatively precise location of the cable may be determined using a homing process such as that just-described.

The just-described prior art method cannot be used to locate the all-dielectric cable 20 of the FIG. 2. In order to locate a concealed all-dielectric cable 20, the cable must be modified in accordance with this invention.

Figure 4:
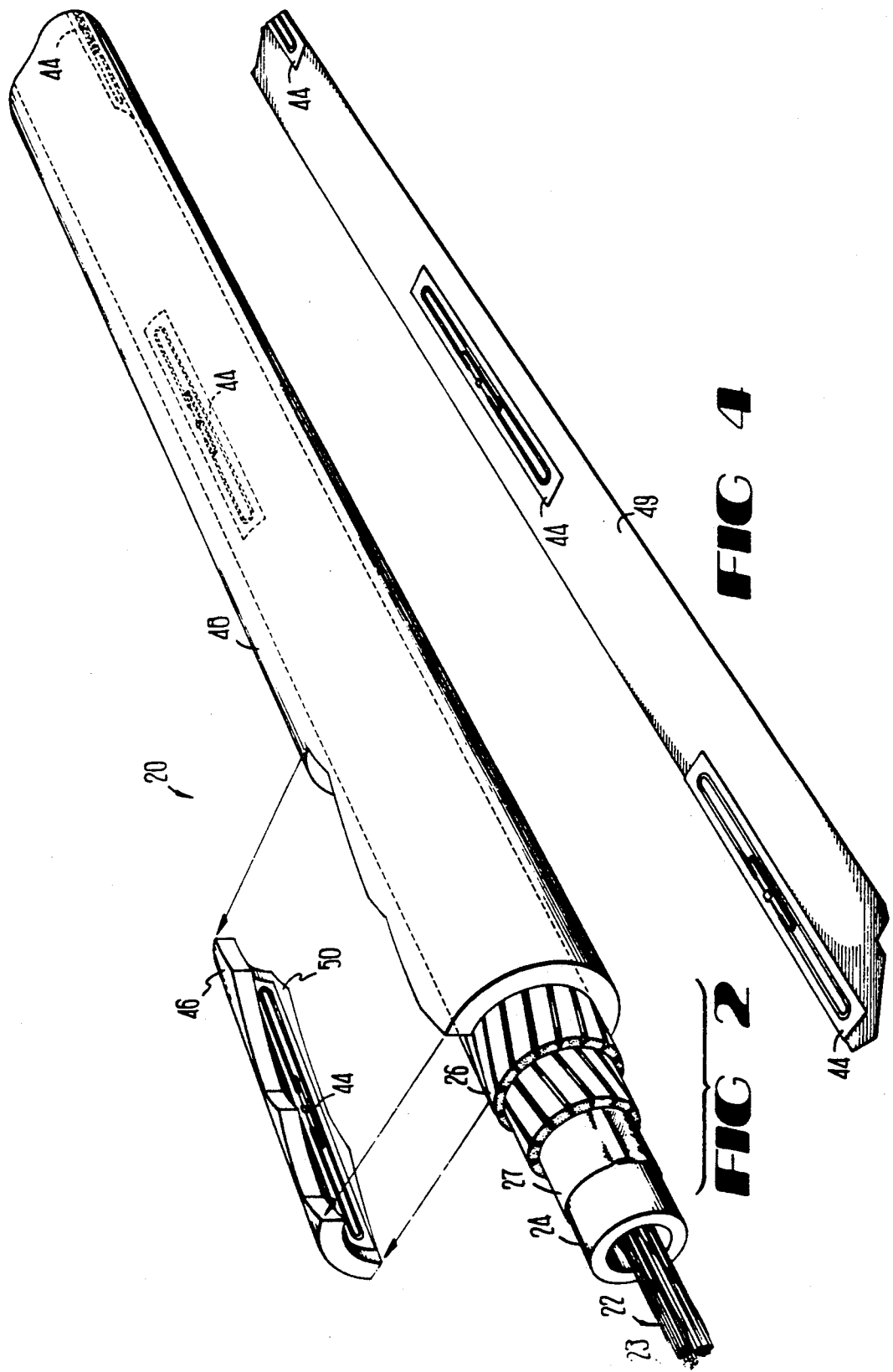
FIG. 4 is a perspective view of a carrier tape upon which a plurality of electronically resonant markers are disposed.

In order to be able to locate a concealed cable such as the all-dielectric cable, the cable is provided with an electronically resonant system. To this end, a plurality of electronically resonant tags or markers 44—44 (see FIG. 2) is caused to be disposed between the core tube 24 and an outer surface 46 of an external sheath member 48. In one embodiment, the electronically resonant markers 44—44 are caused to be embedded in a plastic material which comprises the sheath member 48 adjacent to an inner surface 50 of the sheath member. In a preferred embodiment, the electronically resonant markers 44—44 are spaced not only longitudinally along a carrier tape 49 (see FIG. 4) but also laterally so that when the tape is wrapped about the core tube 24 during a sheathing operation, for example, each successive electronically resonant marker is displaced in a rotational sense, such as for example, 120 degrees from the preceeding electronically resonant marker. The electronically resonant markers 44—44 which are incorporated into the otherwise all-dielectric sheath comprise metallic portions; however, these portions are non-continuous with respect to the length of the cable and in fact are spaced about every 60 cm within the cable. Nor do the electronically resonant markers 44—44 provide any kind of path to electrically ground any portion of the cable. The electronically resonant markers 44—44 then do not cause an increased potential for lightning striking the cable.

Figure 5:
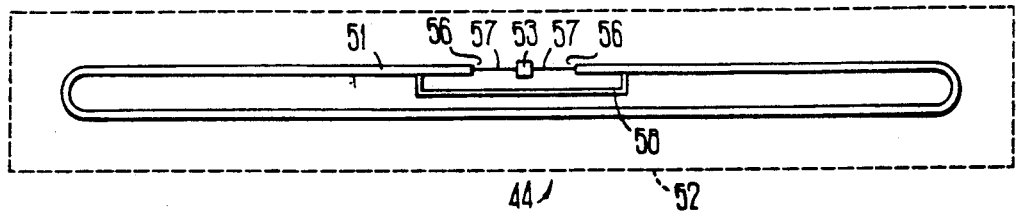
FIG. 5 is a plan view of the electronically resonant marker shown in FIG. 2.
Figure 6:
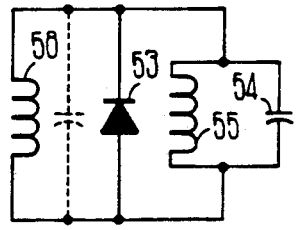
FIG. 6 is an equivalent circuit of the electronically resonant marker shown in FIG. 5.

An illustration of one of the electronically resonant markers 44—44 and an accompanying equivalent circuit are shown in FIGS. 5 and 6. As will be recalled, one method of incorporating the electronically resonant marker into the all-dielectric cable structure is to cause the electronically resonant marker to be disposed between or embedded in members of a cable sheath structure. It is desirable, then, that the electronically resonant marker comprise substantially planar surfaces and be relatively thin.

A typical electronically resonant marker comprises a foil circuit 51 disposed on a planar surface of a relatively thin dielectric substrate 52 and a surface mounted diode 53. The shape of the foil pattern and the arrangement of portions thereof on the planar surface of the dielectric substrate provides capacitive and inductive elements which are represented in the equivalent circuit, FIG. 6, as a capacitor 54 and inductor 55, respectively.

In a preferred embodiment, the inductive foil loop 51 is an open loop with ends 56—56 and is approximately 12 mm wide and 420 mm long which is equal to an electrical ½ wavelength of an electromagnetic signal. A pair of leads 57—57 of the diode 53 are caused to be welded to the ends 56—56 of the inductive foil loop and thus electrically closes the conductive foil loop. Another inductive foil loop, one designated 58, is disposed electrically parallel to the diode 53. The inductive foil loop 58 has an inductance value which exactly resonates with a junction capacitance of the diode 53 at the operating frequency of the electronically resonant marker. This inductance is necessary to prevent the junction capacitance of the diode 53 from shunting the diode which would otherwise reduce the diode's effectiveness as a signal mixer.

The cable 20 to be located in accordance with the methods of this invention would normally be buried to a depth in a range of 0.5-1.5 meters. A tradesperson is shown with a hand held transceiver 60 (see FIG. 1) which comprises a sensor portion 62 which comprises a transmit and receive antenna 63, a transmitter portion 64 and a receiver portion 74 (see FIG. 7). A handle portion 66 comprises a meter transducer 67 and an aural transducer 68 the functions of which are to convert a signal propagated by the sensor portion to a metered signal and an audible signal, respectively. A stalk portion 69 connects the handle portion with the sensor portion.

The tradesperson locates the buried cable 20 by first estimating a general location of a portion of the cable, evidence of which may be the known location of an associated closure in which the cable terminates or is joined to other cables or a general location dictated by custom, practice or map. The tradesperson holds the transceiver 60 in that general location and in such a way that the sensor portion 62 is held close to but not in engagement with the ground surface 21. The sensor portion is also caused to sweep over a portion of the ground surface which includes a portion which is directly above the buried cable 20.

As the tradesperson sweeps the sensor portion 62 above the ground surface, the sensor portion is caused to transmit electromagnetic energy which comprises at least one frequency and which in one embodiment comprises energy of at least two frequencies, $f_a$ and $f_b$, which are within approximately 5% of each other and which are generated by the transmitter portion 64. The electromagnetic energy comprising at least two frequencies is referred to hereinafter as an electromagnetic signal 71. The electromagnetic signal 71 penetrates soil 72 and energizes the electronically resonant markers 44—44 by inducing alternating electric current into those electronically resonant markers which are within range of the electromagnetic signal 71.

The diode 53 of the electronically resonant circuit of each marker 44 acts as a mixer of the two frequencies $f_a$ and $f_b$ of the electromagnetic signal 71 transmitted by the transmitter of the sensor portion 62. When two frequencies are mixed in a non-linear device, such as a diode, harmonic and intermodulation frequency components of the combination of the two frequencies are produced. Therefore, if two signals, represented by the expressions $A \cos(2\pi f_a t)$ and $B \cos(2\pi f_b t)$, are allowed to be mixed in the diode 53, one particularly useful intermodulaton component is produced and is represented by the expression $kA^2B \cos[2\pi(2f_a - f_b)t]$ in which k is a coefficient related to a conversion efficiency of the circuit. If $f_a$ and $f_b$ are fairly close in frequency, the intermodulation frequency component $(2f_a - f_b)$ resulting from the frequencies being mixed in the diode 53 will be relatively close to the frequencies $f_a$ and $f_b$. If $f_a$, $f_b$ and the intermodulation frequency $(2f_a - f_b)$ are relatively close, it is possible that the antenna 63 may be a common antenna to transmit frequencies $f_a$ and $f_b$ and to receive a return signal 73 comprising the intermodulation frequency $(2f_a - f_b)$ which is radiated by the electronically resonant marker. Since the power of the return signal 73 is proportional to the square of the power of the signal $f_a$ it should be realized that the return signal may be maximized by providing extra power into just the $f_a$ signal.

The magnitude of the radiated signal 73 received by the sensor portion 62 must be of sufficient strength to provide an acceptable signal-to-noise ratio for the receiver portion 74. The magnitude of the energy absorbed and radiated by the electronically resonant marker and then received by the receiver portion 74 of the sensor portion 62 is, among other things, a function of the frequency of the electromagnetic signal 71, the magnitude of the electromagnetic signal incident on the electronically resonant marker, an effective exposed surface area of the electronically resonant marker and local soil conditions.

The frequency and magnitude of the radiated signal 73 are to a great extent determined by the characteristics of the electronically resonant marker chosen, the range of depths over which the cable locating method and equipment are to be effective, and the local soil conditions. The frequency and magnitude are optimized as necessary to satisfy performance requirements.

The effective exposed surface area of the electronically resonant marker is the actual surface area of the electronically resonant marker multiplied by the sine of the angle of incidence of the transmitted signal with the electronically resonant marker. Therefore if the electromagnetic signal 71 is incident normal to the planar surface of the electronically resonant marker, then the effective exposed surface area of the electronically resonant marker is the product of 1 and the actual surface area which is equal to the actual surface area and thus the magnitude of the energy absorbed and radiated would be maximized. If the electromagnetic signal is parallel to the planar surface of the electronically resonant marker then the effective exposed surface area is the product of 0 and the actual surface area and therefore the absorbed energy would be zero. As can be seen, the effective exposed surface area of the electronically resonant marker varies depending on the orientation of the electronically resonant markers with respect to the transmitted signal.

Figure 8:
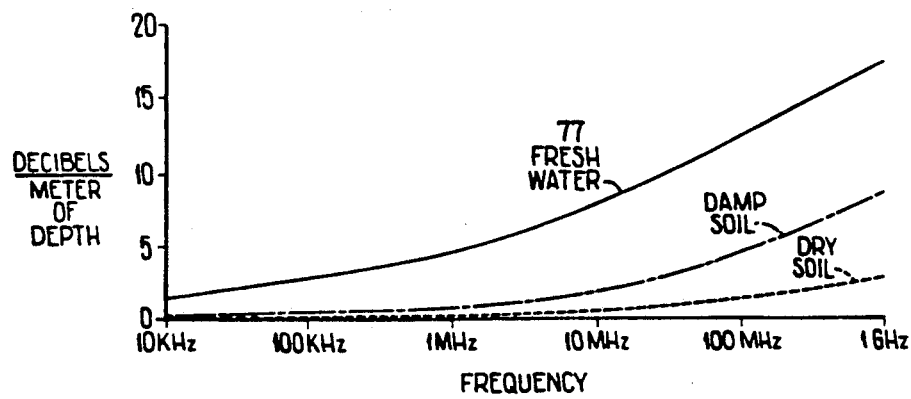
FIG. 8 is a graphical representation of one-way soil attenuation of an electromagnetic signal.

Soil attenuation is a variable that influences not only the electromagnetic signal on its trip to the electronically resonant marker but also influences the signal radiated by the electronically resonant marker and received by the receiver portion 74. The attenuation of an electromagnetic signal as it passes through soil is a function of the condition of the soil through which the signal passes and the signal frequency. Looking at FIG. 8 it may be seen that one way soil attenuation rises as transmitted signal frequency rises for all types of soil conditions. Further, one way soil attenuation is also a function of the moisture content of the soil. For instance, soil attenuation (dB/meter of depth) of an electromagnetic signal for dry soil rises from approximately 0.5 dB to 2.5 dB/meter of depth for signal frequecies from 1 MHz to 1 GHz, respectively. For damp soil, the soil attenuation rises from 1.5 dB to 7.5 dB/meter of depth of soil for electromagnetic signal frequencies from 1 MHz to 1 GHz, respectively. Also included on the graph of FIG. 8 is a plot 77 showing the attenuation of an electromagnetic frequency through water as a function of frequency. An electromagnetic signal traveling through water attenuates at the rate of 4 dB/meter of depth and 17.5 dB/meter of depth for electromagnetic signal frequencies from 1 MHz to 1 GHz, respectively.

For a signal which propagates from a point source, which is the case of the signal propagated by the transmitter portion 64 of this invention, the signal strength at a distance d from the source is proportional to $1/d^2$. In the case of a signal returning through the distance d (total distance being 2d), the strength of the return signal is proportional to $1/d^4$. The $1/d^4$ is a familiar relationship of the strength of a return radar signal and applies for distances which are large compared to a wavelength. For the purposes of buried cable, the distance is on the order of one meter or less. A frequency with a wavelength of the order of one meter or less corresponds to a frequency of 300 MHz or higher. For frequencies at or below this frequency, the relationship of returned signal strength to d changes from $1/d^4$ to $1/d^6$. It therefore is preferable to operate at a system frequency at least about 300 MHz.

A choice of a relatively high operating frequency limits detection techniques used to separate the return signal from the transmitted signal. For instance, pulse gating techniques cannot be used. Assuming a resonant circuit "Q" of about 10 (wherein the Q of a system relates to a slope of a decay curve of a de-energizing resonant circuit), the energy in the electronically resonant marker is such that ringing could be expected to last for only about 30. This would not be enough time to transmit a signal, to turn off the transmitter and then to turn on a receiver to look for a return signal. Therefore, in an alternative method, a signal comprising two frequencies to generate a signal having a third frequency, is used. The third signal is the intermodulation component as described hereinbefore, and the detection thereof may be used for distinguishing a transmitted signal from a received signal.

Figure 7:
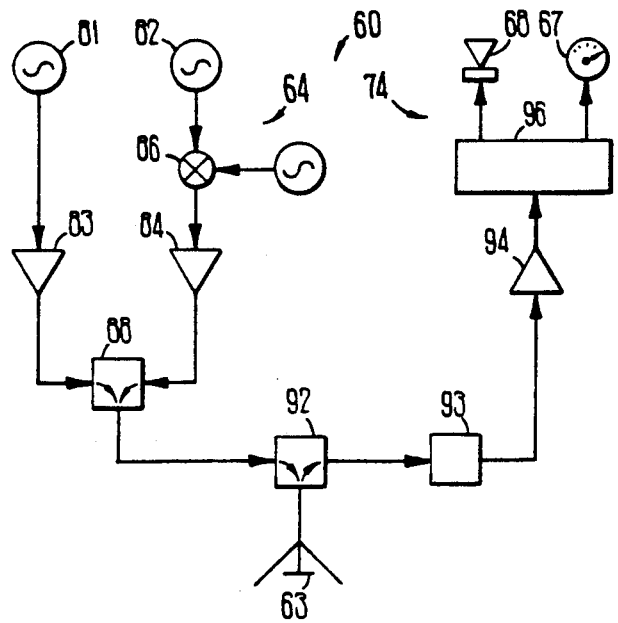
FIG. 7 is a block diagram of a transceiver used in carrying out the locating method of this invention.

In FIG. 7 there is shown a block diagram of the transceiver 60. The transmitter portion 64 comprises a pair of stable oscillators 81 and 82 for generating signals $f_a$ and $f_b$, respectively. The signals $f_a$ and $f_b$ are amplified by amplifiers 83 and 84, respectively. The signal $f_a$ is amplified to a higher level than the signal $f_b$ for the reason discussed previously. Typically, the amplitude of signal $f_a$ is caused to be 20 dB higher than the amplitude of signal $f_b$. For the purpose of enhancing the signal detection ability of the receiver portion 74, the transmitted signal $f_b$ may be modulated by a mixer 86 at the output of the oscillator 82.

After sufficient amplication in amplifiers 81 and 82, respectively, the signals $f_a$ and $f_b$ are caused to be combined in a power combiner 88 and the combined signal comprising two frequencies is sent to the high gain antenna 63 via a directional coupler 92. The power combiner 88 also serves to isolate the amplifiers 81 and 82 from each other so that spurious intermodulation products are not generated within the amplifiers. It should be understood that the transmitted electromagnetic energy may comprise two signals, each at its own frequency, with the signals being combined at a target marker 44. The directional coupler 92 allows a common antenna to function as both a transmitting and receiving antenna. The directional coupler prevents the direct entry of the transmitted signal into the receiving portion 74 of the transceiver 60.

The return signal 73 is received by the antenna 63 and is fed to a notch filter 93 via the directional coupler 92. The notch filter 93 is effective to prevent portions of the transmitted signals $f_a$ and $f_b$ from reaching other portions of the receiver portion 74 of the transceiver 60. Otherwise, portions of the signals $f_a$ and $f_b$ could overload those portions of the receiver portion 74 which would possibly result in the generation of extraneous intermodulation products identical in frequency to those intermodulation components being radiated by the electronically resonant marker.

The return signal 73 leaves the notch filter 93 and is caused to be amplified and filtered in at least one band pass filter 94 so that only a signal comprising a very narrow frequency spectrum in which primarily the desired intermodulation frequency ($2f_a - f_b$) is included, is allowed to pass to a detector 96. The detector 96 produces a D.C. voltage or low frequency audio signal as a result of the modulation of signal $f_b$ in the transmitter portion. The D.C. voltage may be used to drive a meter or other signal level indicating device and the audio signal may be sent to a speaker for the purpose of providing an audible output as an indicator of the strength of the radiated signal.

The receiver portion 74 (see again FIG. 7) is tuned to receive only the intermodulation component of the two transmitted frequencies. The return signal 73 varies in strength depending on, among other things, the depth to which the cable 20 is buried and the conditions of the soil 70. As the sensor portion of the transceiver 60 is caused to sweep above the ground and transmit and receive signals, the return signal is caused to be converted into a human sensory stimulating signal, for example, an audible signal or a meter signal which varies depending on the strength of the return signal. For example, when the sensor portion 62 is positioned directly above the cable a highest relative volume of the audible signal is heard. The audible signal will decrease in volume as the sensor portion 62 is moved from this position. A homing process wherein the sensor portion is caused to be moved from side-to-side with progressively shorter sweeps until the highest indicated signal strength is achieved will allow the tradesperson to locate accurately the position of the cable 20.

It is to be understood that the above-described arrangements are simply illustrative of the invention. Other arrangements may be devised by those skilled in the art which will embody the principles of the invention and fall within the spirit and scope thereof.

We claim:

1. A method of locating a concealed object, said method including the steps of:
   causing at least one electronically resonant which is associated with an object marker to become energized by inducing into the electronically resonant marker associated with the concealed object an alternating electric current comprising at least two frequencies, the source of which is a remote radiating transmitter; and
   detecting a radiated electromagnetic field, having a third frequency, the source of which is the energized electronically resonant marker, with a remote detecting device to locate the object.

2. The method of claim 1, wherein the alternating electric current comprises a first frequency and a second frequency.

3. The method of claim 2, wherein the first frequency is at least about 300 MHz.

4. The method of claim 2, wherein the second frequency is within about 5% of the first frequency.

5. The method of claim 4, wherein the third frequency is a harmonic of the first or second frequency.

6. The method of claim 4, wherein the third frequency is an intermodulation term of the first and the second frequency.

7. The method of claim 4, wherein the resonant marker is resonant at a frequency which is within about 5% of said first and second frequencies.

8. An object, which is locatable, notwithstanding the concealment thereof, said locatable object comprising:
   an object which is destined to be concealed; and
   an electronically resonant marker associated with said object, said marker comprising a self-contained resonant loop and being capable of receiving energy comprising at least two frequencies and of generating and radiating a signal of at least one other frequency which differs from the two frequencies.

9. The object of claim 8, wherein said self-contained resonant loop comprises a relatively thin dielectric substrate sheet upon which is disposed a foil circuit effective to provide predetermined capacitive and inductive elements and wherein said marker further comprises a diode element.

10. The object of claim 9, wherein said resonant loop is an electrical ½ wavelength loop.

11. The locatable object of claim 8, wherein said object is continuously extending.

12. The locatable object of claim 11, wherein said continuously extending object is a tube.

13. The tube of claim 12, wherein said tube is comprised only of dielectric materials.

14. The tube of claim 12, wherein at least one electronically resonant marker is caused to be disposed in adherent engagement with an outer surface of said tube.

15. The tube of claim 12, wherein a plurality of electronically resonant markers are caused to be disposed in adherent engagement with an outer surface of the tube and wherein said plurality of electronically resonant markers are longitudinally and angularly displaced uniformly throughout a predetermined length of said tube.

16. An optical fiber cable comprising:
    at least one optical fiber; and
    a sheath system with a plurality of resonant markers spaced therealong, each said marker comprising
       an electronically resonant marker associated with said cable, said marker comprising a self-contained resonant loop and being capable of receiving energy comprising at least one frequency and of generating and radiating a signal of at least one other frequency which differs from said at least one frequency.

17. The optical fiber cable of claim 16, wherein said fiber and said sheath system comprise only materials which are dielectric.

18. The optical fiber cable of claim 16, wherein said sheath system comprises a plurality of members comprising a core tube within which the optical fiber is disposed, a longitudinally extending outer jacket disposed about said core tube and at least one longitudinally extending strength member disposed between an outer surface of said core tube and an outer surface of said outer jacket.

19. The optical fiber cable of claim 18, wherein each said electronically resonant marker is disposed between an exterior surface of said outer jacket and said at least one optical fiber.

20. The optical fiber cable of claim 18, wherein a plurality of electronically resonant markers are caused to be disposed between an exterior surface of said outer jacket and said at least one optical fiber and wherein said plurality of electronically resonant markers are spaced longitudinally and circumferentially throughout a predetermined length of said cable.

21. The optical fiber cable of claim 16, wherein said electronically resonant markers are caused to be disposed in adherent engagement with an outer surface of said sheath system.

22. The optical fiber cable of claim 16, wherein a plurality of electronically resonant markers are caused to be disposed in adherent engagement with an outer surface of said sheath system and wherein said plurality of electronically resonant markers are longitudinally and circumferentially displaced uniformly throughout a predetermined length of said sheath system.

23. A system for locating a concealed object, said system comprising:
    a concealed object with at least one electronically resonant marker being associated with said concealed object, said at least one marker comprising a self-contained resonant loop, said at least one marker being capable of receiving energy from energy being transmitted at least at two frequencies and of generating a signal of at least one other frequency and of radiating a signal at said one other frequency;

means for transmitting electromagnetic energy comprising at least first and second frequencies and for receiving signals which are radiated at a third frequency;

means for discriminating between the transmited energy and the radiated signal; and indicating means responsive to receipt of a valid signal at the third frequency for indicating the presence of the concealed object.

24. The system of claim 23, wherein:

said means for transmitting electromagnetic energy at first and second frequencies comprises;

first and second oscillators which are effective to provide first and second signals at first and second frequencies;

first and second amplifiers effective to amplify the first and second signals of the oscillators; and a power combiner which is effective to combine the amplified first and second signals into a signal comprising two frequencies and to isolate said amplifiers from each other; and wherein said system further includes:

a directional coupler which is effective to prevent the signal comprising two frequencies from entering the means for receiving signals; and an antenna which is effective to transmit the signal comprising two frequencies.

25. The system of claim 24 wherein;

said means for receiving signals which are transmitted at a third frequency comprises;

an antenna which is effective to absorb a signal transmitted at a third frequency;

a narrow band amplifier which is effective to filter and to amplify a desired portion of the signal radiated at the third frequency;

a notch filter which is effective to prevent portions of the transmitted signal comprising two frequencies from entering the narrow band amplifier; and a detector portion which is effective to receive a desired portion of the radiated third frequency and to produce a signal which is related to the strength of the radiated third frequency.

26. A marker which is adapted to be associated with a concealed object to facilitate location the concealed object, said marker comprising:

a resonant loop which comprises a self-contained resonant loop, said marker being capable of receiving energy at two frequencies; and means for generating and radiating a signal of at least one other frequency which differs from the two frequencies.

27. The marker of claim 26, said marker comprising;

a dielectric sheet;

a first conductive foil loop being disposed in engagement with the dielectric sheet and comprising a pair of ends and being effective to receive energy comprising at least two frequencies;

a diode which comprises two leads which are engaged conductively with said pair of ends of said first conductive foil loop and which is effective to mix the frequencies of energy received by the first conductive foil loop; and a second conductive foil loop disposed electrically parallel to said diode and being effective to prevent a capacitance of said diode from shunting said diode.

28. A method of locating a concealed cable, said method including the steps of:

causing at least one of a plurality of electronically resonant markers which are disposed along a length of cable which is concealed to become energized by inducing into the electronically resonant markers associated with the concealed cable an alternating electric current comprising at least one frequency, the source of which is a remote radiating transmitter; and detecting a radiated electromagnetic field, having a frequency, which is different from said at least one frequency, the source of which is at least one of the energized electronically resonant markers, with a remote detecting device to locate the cable.

29. A system for locating a concealed object, said system comprising;

a concealed cable with a plurality of electronically resonant markers being associated with and spaced along said concealed cable, said at least one marker comprising a self-contained resonant loop, said at least at one marker being capable of receiving energy from energy being transmitted at least at one frequency and of generating a signal of another frequency which differs from said at least one frequency and of radiating a signal at said another frequency;

means for transmitting electromagnetic energy comprising said at least one frequency and for receiving signals which are radiated at said another frequency;

means for discriminating between the transmitted energy and the radiated signal; and indicating means responsive to receipt of a valid signal at said another frequency for indicating the presence of the concealed cable.

* * * * *